(12) United States Patent
Hattori

(10) Patent No.: US 8,669,098 B2
(45) Date of Patent: Mar. 11, 2014

(54) BIO-MICROARRAY AND A SUBSTRATE FOR USE THEREWITH

(75) Inventor: Hideshi Hattori, Tokyo-to (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 826 days.

(21) Appl. No.: 12/899,007

(22) Filed: Oct. 6, 2010

(65) Prior Publication Data

US 2011/0021380 A1 Jan. 27, 2011

Related U.S. Application Data

(62) Division of application No. 10/798,001, filed on Mar. 11, 2004, now abandoned.

(30) Foreign Application Priority Data

Mar. 14, 2003 (JP) .................................. 2003-070639

(51) Int. Cl.
*C12M 1/34* (2006.01)
(52) U.S. Cl.
USPC ........................................................ 435/287.9
(58) Field of Classification Search
None
See application file for complete search history.

(56) References Cited

U.S. PATENT DOCUMENTS

| | | | |
|---|---|---|---|
| 2,713,286 A | | 7/1955 | Taylor |
| 3,979,184 A | | 9/1976 | Giaever |
| 4,994,318 A | | 2/1991 | Patel |
| 5,143,854 A | | 9/1992 | Pirrung et al. |
| 5,412,087 A | | 5/1995 | McGall et al. |
| 5,418,136 A | * | 5/1995 | Miller et al. ...................... 435/5 |
| 5,468,606 A | | 11/1995 | Bogart et al. |
| 5,583,840 A | | 12/1996 | Minemura et al. |
| 5,959,098 A | * | 9/1999 | Goldberg et al. ............. 536/25.3 |
| 6,060,237 A | | 5/2000 | Nygren et al. |
| 6,078,705 A | | 6/2000 | Neuschafer et al. |
| 6,143,247 A | | 11/2000 | Sheppard, Jr. et al. |
| 6,307,042 B1 | | 10/2001 | Goldberg et al. |
| 6,362,004 B1 | | 3/2002 | Noblett |
| 7,195,872 B2 | * | 3/2007 | Agrawal et al. ............. 435/287.2 |
| 2002/0192664 A1 | * | 12/2002 | Nygren et al. ...................... 435/6 |
| 2003/0109062 A1 | | 6/2003 | Inomata et al. |
| 2004/0053354 A1 | * | 3/2004 | Ikawa et al. .................. 435/40.5 |
| 2004/0208350 A1 | * | 10/2004 | Rea et al. ...................... 382/128 |

FOREIGN PATENT DOCUMENTS

| | | |
|---|---|---|
| JP | 2002-508837 T | 3/2002 |
| JP | 2002-153272 A | 5/2002 |
| JP | 2002-249821 A | 9/2002 |
| JP | 2002-274077 A | 9/2002 |
| JP | 2003-035710 A | 2/2003 |
| WO | 98/53304 A1 | 11/1998 |
| WO | 00/61282 A1 | 10/2000 |

OTHER PUBLICATIONS

Hideshi Hattori; "Anti-Reflection Surface with Particle Coating Deposited by Electrostatic Attraction", Advanced Materials (2001), vol. 13, No. 1, pp. 51-54.
USPTO OA mailed May 17, 2005 in connection with U.S. Appl. No. 10/798,001.
USPTO OA mailed Feb. 6, 2006 in connection with U.S. Appl. No. 10/798,001.
USPTO OA mailed Apr. 19, 2007 in connection with U.S. Appl. No. 10/798,001.
USPTP OA mailed May 16, 2007 in connection with U.S. Appl. No. 10/798,001.
USPTO OA mailed Sep. 11, 2007 in connection with U.S. Appl. No. 10/798,001.
USPTO OA mailed Mar. 11, 2008 in connection with U.S. Appl. No. 10/798,001.
USPTO OA mailed Sep. 19, 2008 in connection with U.S. Appl. No. 10/798,001.
USPTO OA mailed Jun. 8, 2009 in connection with U.S. Appl. No. 10/798,001.
USPTO OA mailed Sep. 30, 2009 in connection with U.S. Appl. No. 10/798,001.
USPTO OA mailed May 11, 2010 in connection with U.S. Appl. No. 10/798,001.

* cited by examiner

*Primary Examiner* — Ann Lam
(74) *Attorney, Agent, or Firm* — Ladas & Parry LLP

(57) ABSTRACT

For the purpose of improving the accuracy of a variety analyses using a bio-microarray, it is a main object of the invention to provide a bio-microarray capable of producing relatively high signal intensity from a fluorescent molecule and capable of having improved quantification performance and to provide a substrate for bio-microarray.
In order to achieve the object, the invention provides a substrate for bio-microarray characterized by having a reflection-suppressing function.

7 Claims, 2 Drawing Sheets

BIO-MICROARRAY AND A SUBSTRATE FOR USE THEREWITH

BACKGROUND OF THE INVENTION

1. Field of the Invention

The invention relates to a bio-microarray having probe biomolecules such as DNA, peptide, protein, polysaccharide, cell, and tissue, which are arranged in an array, and also relates to a substrate for bio-microarray.

2. Description of the Related Art

In recent years, the target of development of bio-microarrays (also referred to as biochips) has been expanded and thus includes not only DNA microarrays, which have been used in genome analysis, but also microarrays that load any other biomolecules such as peptide, protein, polysaccharide, cell, and tissue.

The bio-microarray analysis method generally includes the processes of introducing a fluorescent molecule as a label into a sample and analyzing light emission from the fluorescent molecule, because such a process is appreciated as having a high sensitivity and a variety of available labels. Examples of the analytical apparatus according to this method include: a high accuracy type apparatus that uses the principle of confocal microscope and performs a spot-by-spot analysis on the bio-microarray; and a high throughput type apparatus that uses a charge-coupled device array or the like as a detector and analyzes a plurality of spots in a specific region at a time. In this method, for example, the data signal-to-noise ratio can be reduced by such a factor as a noise generated at the time of data amplification/conversion, the reflection of excitation light (incident light), dust on the substrate, an unevenness in the surface treatment state of a glass substrate, and a background fluorescence. In particular, the reflection of excitation light is a remarkable cause of the reduction inaccuracy that can come from the substrate.

On the other hand, an increase in the detected signal intensity requires sufficient absorption of the excitation light into the label of the fluorescent molecule, and therefore, in some cases, suppression of the reflection of the excitation light can reduce the analysis accuracy depending on the intensity of the excitation light.

Thus, it is desirable that the user should use different substrates so that the reflection of excitation light can be reduced or increased depending on the intensity of the excitation light. Specifically, however, substrates produced with no optical processing and substrates having the function of increasing the reflection are only commercially available now. In some cases, such substrates cannot provide sufficient analytical accuracy, depending on the intensity of the excitation light.

SUMMARY OF THE INVENTION

For the purpose of improving the accuracy of a variety of bio-microarray analyses, it is a main object of the invention to provide a bio-microarray capable of producing relatively high signal intensity from a fluorescent molecule and capable of having improved quantification performance and to provide a substrate for bio-microarray.

The invention provides a substrate for bio-microarray characterized by having a reflection-suppressing function. The inventive substrate for bio-microarray has the function of suppressing reflection and thus can increase the analysis accuracy through a relative increase in the signal intensity of the fluorescent molecule by the suppression of the reflection of the excitation light.

In the invention, at least one of an anti-reflection layer and a light-absorbing layer is preferably formed on the surface of the substrate so as to produce the reflection-suppressing function. The anti-reflection layer can suppress the reflection by increasing the transmittance of the excitation light, or the light-absorbing layer can suppress the reflection by absorbing the excitation light. The reflection-suppressing function can easily be given to the microarray substrate by the formation of the anti-reflection layer or the light-absorbing layer.

In the invention, at least one of the anti-reflection layer and the light-absorbing layer is preferably formed in a pattern. When the anti-reflection layer or the light-absorbing layer having the reflection-suppressing function is formed in a pattern, the region having the reflection-suppressing function can be selected. In such a structure, the signal intensity of the fluorescent molecule can be increased while the reflection of the excitation light can be suppressed, so that the analysis accuracy can further be improved.

In the invention, the surface of the substrate also preferably has a fine uneven structure or a fine porous structure. Such a structure can have a high density of probe biomolecules immobilized on the surface of the substrate and thus can increase the detection accuracy.

In addition, the anti-reflection layer preferably has a fine uneven structure or a fine porous structure, or the light-absorbing layer preferably has a fine uneven structure or a fine porous structure. When the anti-reflection layer or the light-absorbing layer has a fine uneven structure or a fine porous structure, such a layer formed on the substrate can provide both the effect of suppressing the reflection and the effect of increasing the density of probe biomolecules immobilized on the surface of the substrate, so that the detection accuracy can easily be improved.

In the invention, an immobilization layer for immobilizing the probe biomolecule on the substrate is preferably formed in a pattern. Such a structure can prevent the diffusion of the probe biomolecule and thus can provide a higher packing density. Such a structure can also prevent the adsorption of unnecessary probe biomolecules and thus can further increase the analysis accuracy.

In the invention, a mark for positional detection is preferably formed on the substrate. Such a structure can provide an improvement in workability and a reduction in error rate in the process of immobilizing the probe biomolecule on the substrate and in the analysis process thereafter.

The invention also provides a bio-microarray characterized by comprising any of the above-mentioned substrates for bio-microarray and a probe biomolecule immobilized on the substrate. The bio-microarray using the inventive substrate for bio-microarray can relatively increase the signal intensity of the fluorescent molecule and can have good quantification performance, so that it can produce a high analytical accuracy.

The inventive substrate for bio-microarray has the reflection-suppressing function and thus can form a bio-microarray with a relatively increased signal intensity of a fluorescent molecule and a high analytical accuracy. An anti-reflection layer, a light-absorbing layer or a substrate surface each having a specific structure may be used to provide the reflection-suppressing function. In such a case, not only the reflection-suppressing function but also a high packing density of probe biomolecules can be provided so that a bio-microarray with good quantification performance can be provided. In a case where the reflection-suppressing function and the reflection function are provided in a pattern, the signal intensity of the fluorescent molecule can be increased while the reflection of unnecessary excitation light can be suppressed, so that the analysis accuracy of the bio-microarray can further be improved.

DESCRIPTION OF THE PREFERRED EMBODIMENT

First, a detailed description is provided of the inventive substrate for bio-microarray and a method of producing the same.

A. Substrate for Bio-Microarray

The inventive substrate for bio-microarray is characterized by having the reflection-suppressing function and thus has an advantage that it can relatively increase the signal intensity of a fluorescent molecule used as a label by suppressing the reflection of excitation light that excites the fluorescent molecule. First, such a reflection-suppressing function is described below.

Reflection-Suppressing Function

In the invention, the reflection-suppressing function can be produced by a method of increasing the transmittance of excitation light, a method of absorbing the excitation light, or the like.

The method of suppressing the reflection by increasing the transmittance of excitation light may generally be a method of forming an anti-reflection layer on a surface but may alternatively be a method of producing an anti-reflection function by processing the surface of the substrate. The method of suppressing the reflection by absorbing excitation light may be a method of forming a light-absorbing layer on a surface or a method of using a substrate originally having a light-absorbing function.

The anti-reflection layer may be formed on the substrate surface on the side where the probe biomolecule will be immobilized or on the side opposite to it. The anti-reflection layer is preferably formed on the surfaces on both sides in terms of preventing reflection on both sides. Similarly, the anti-reflection function may be given to the substrate surface on the side where the probe biomolecule will be immobilized or on the side opposite to it, and is preferably given to the surfaces on both sides.

The light-absorbing layer may also be formed on the substrate surface on the side where the probe biomolecule will be immobilized or on the side opposite to it. In view of its characteristics, it may generally be formed on either side surface. In the case where the substrate itself has the light-absorbing function, the substrate may entirely has the light-absorbing function, as in a case where the substrate is entirely black, or the substrate surface may have the light-absorbing function only on the side where the probe biomolecule will be immobilized or on the side opposite to it.

In the invention, any of these conditions may appropriately be selected or combined so that the most preferred mode can be used according to the conditions such as the type of the substrate and the type of the immobilization layer.

FIG. 1 each show an example of the substrate for bio-microarray with the reflection-suppressing function provided by the above method.

Figure 1A:
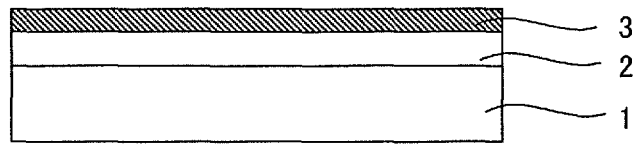
FIG. 1 are schematic diagrams each showing an example of the inventive substrate for bio-microarray.
Figure 1B:
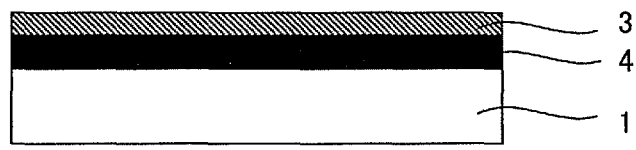

FIG. 1A shows an example in which an anti-reflection film 2 is formed on a substrate 1, and an immobilization layer 3 for immobilizing probe biomolecules is formed thereon. FIG. 1B shows an example in which a light-absorbing layer 4 is formed on the substrate 1, and the immobilization layer 3 is formed thereon. In both examples, the function is given to the substrate surface on the side where the probe biomolecules will be immobilized.

Figure 1C:
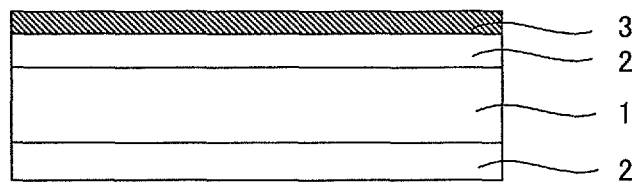
Figure 1D:
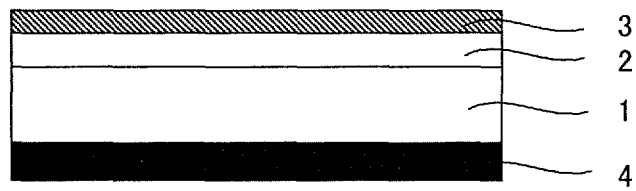

FIG. 1C shows an example in which the anti-reflection layer 2 is formed on both side surfaces of the substrate 1, and the immobilization layer 3 is formed on one of the anti-reflection layers 2. FIG. 1D shows an example in which the anti-reflection layer 2 is formed on the surface of the substrate 1 on the side where the probe biomolecule will be immobilized; the immobilization layer 3 is stacked on the surface thereof; and the light-absorbing layer 4 is formed on the opposite side surface of the substrate 1.

When the anti-reflection layer 2 according to the invention is formed on the surface of the substrate 1 on the side where the probe biomolecule will be immobilized, the reflection from the other surface should be suppressed, and thus it is preferred that the anti-reflection layer 2 or the light-absorbing layer 4 is formed on the other surface.

In addition, any other functional layer may also be formed between the respective layers. For example, an adhesive layer for improving the adhesion properties may also be formed. The anti-reflection layer 2 and the light-absorbing layer 4 may each comprise a single layer or multiple layers. Specifically, the anti-reflection layer 2 comprising multiple layers is generally formed by stacking a low refractive index layer and a high refractive index layer alternately.

A description is then provided of the region having such a reflection-suppressing function (hereinafter, also referred to as a reflection-suppressing function region).

In the invention, such a reflection-suppressing function region may be formed over the entire surface of the substrate, or may be formed in a pattern to produce higher detection accuracy. In such a structure, the reflection-suppressing function region may have any mode of the above combinations, and for example, the patterned region may be a patterned anti-reflection layer, a patterned light-absorbing layer, a patterned anti-reflection layer formed on both side surfaces of the substrate as in the above example, or the like.

In the invention, the pattern of the reflection-suppressing function region may be formed only in a region other than the region where the probe biomolecule will be immobilized (hereinafter also referred to as a probe molecule immobilization region) or may be formed only in such a probe biomolecule immobilization region. If the excitation light will be applied over the entire surface of the substrate at the time of detecting fluorescence from the label, it is preferred that the pattern should be formed only in a region other than the probe biomolecule immobilization region. It is because in such a case, the reflection of the excitation light from the region other than the probe biomolecule immobilization region can be a cause of a reduction in detection accuracy. On the other hand, if the excitation light will be applied only to the probe biomolecule immobilization region, it is preferred that the reflection-suppressing function region should be patterned only in the probe biomolecule immobilization region. It is because the problem of the excitation light reflection could occur in the probe biomolecule immobilization region.

In the mode where the reflection-suppressing function region is formed only in the region other than the probe biomolecule immobilization region according to the invention, the probe biomolecule immobilization region may be a reflection function region having the function of reflecting the excitation light. Such a structure has an advantage that the accuracy of the detection by the reflected light from the excitation light can be reduced at the time of applying the excitation light while the excitation light is reflected from the probe biomolecule immobilization region so that the label of the fluorescent molecule can easily be excited. When the label of the fluorescent molecule emits light, the fluorescent light is also reflected from the substrate side so that the fluorescent light can easily be detected and that the detection accuracy can be increased.

In such a structure, any reflection function region may be provided, as long as it has the function of reflecting the excitation light and the fluorescent light from the label. For example, such a region is formed by a method of forming a reflecting layer on the substrate or the like.

Thus, the probe biomolecule immobilization region may be the reflection function region while the region other than the probe biomolecule immobilization region may be the reflection-suppressing function region. For example, a method of forming such regions includes the processes of: patterning the reflecting layer on the substrate surface on the side where the bio-macromolecule will be immobilized in order to form the reflection function region; and patterning the light-absorbing layer on the opposite side surface in order to form the reflection-suppressing function region, wherein the same photomask is used in the processes; one side surface is patterned by a positive type photoresist and another side surface is patterned by a negative type photoresist in the processes. Fine Uneven Structure or Fine Porous Structure According to the invention, a fine uneven structure or a fine porous structure is preferably formed at the substrate surface on the side where the probe biomolecule will be immobilized, in order to increase the detection accuracy of the fluorescent light for use as a label.

Such a fine uneven or fine porous structure can significantly increase the surface area for immobilizing the probe biomolecules. Even if the surface region has the same appearance, the region formed with the fine uneven or fine porous structure can immobilize more probe biomolecules so that the detection accuracy can significantly be increased.

Such a fine uneven or fine porous structure may be formed in at least the probe biomolecule immobilization region, and thus may be formed in a pattern only in the probe biomolecule immobilization region or may be formed over the entire surface.

In a particularly preferred mode of the invention, the anti-reflection layer or the light-absorbing layer has the fine uneven structure or the fine porous structure. It is because such a structure can dramatically improve the detection accuracy by both of the detection accuracy-increasing effect of the anti-reflection or light-absorbing layer formation and the detection accuracy-increasing effect of the fine uneven or fine porous structure formation.

The fine uneven or fine porous structure of the anti-reflection or light-absorbing layer may be formed one or both sides of the substrate. If the structure is formed on one side, it should preferably formed on the side where the probe biomolecule will be immobilized, in terms of higher packing density of the probe biomolecules.
Anti-Reflection Layer Any anti-reflection layer can be used in the invention as long as it can produce high transmittance of excitation light. The anti-reflection layer preferably has a refractive index smaller than that of the substrate and a thickness sufficient for the prevention of the reflection.

In the invention, the anti-reflection layer may have a flat structure but preferably has the fine uneven or fine porous structure as described above.

For example, the anti-reflection layer having the flat structure may be a film formed of a material having a generally low refractive index, a laminate of a low refractive index layer and a high refractive index layer as shown above, or the like.

Examples of the material for the anti-reflection layer with the flat structure include silicon oxides (for a low refractive index layer) and niobium oxides, Ti oxides, zirconium oxides, and ITO (for a high refractive index layer).

Such a flat anti-reflection layer may be formed by any conventional method such as a dry method including a vacuum deposition method, a sputtering method, a CVD method, or the like; and a coating method.

Examples of the anti-reflection layer having the fine uneven or fine porous structure are described with reference to FIGS. 2, and 3.

Figure 2A:
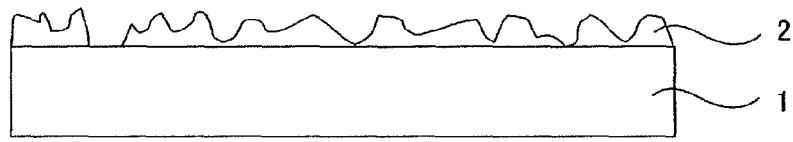
FIG. 2 are schematic diagrams each showing an example of the anti-reflection layer according to the invention.
Figure 2B:
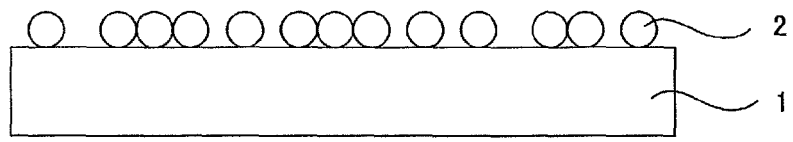

FIGS. 2A and 2B are schematic diagrams each showing an example of the anti-reflection layer 2 having the fine uneven structure formed on the substrate 1. As shown in the drawings, the fine uneven structure may be formed by a method including the process of processing a flat film by etching or the like so as to form unevenness or may be formed by arranging fine particles with any of various shapes in a layer.

The unevenness may also be formed by a process including the processes of: applying, to a substrate, a coating liquid comprising different polymers incompatible with one another and a solvent in which the polymers are dissolved; drying it to form a phase-separated film; and then treating the film with a solvent which can dissolve one polymer but cannot dissolve the other polymer(s) (a reference material: Walheim et al., Science, Vol. 283, page 520, 1999). The anti-reflection layer having the uneven structure may also be formed by any general technique such as a sputtering method, a physical vapor deposition (PVD) method, a chemical vapor deposition (CVD) method, and a sol-gel coating method. Particularly when the substrate is made of a plastic, the uneven anti-reflection structure may be formed by embossing (imprint process). Specifically, when the substrate is made of alumina, aluminum with alumina layer at the surface or silicon, the anti-reflection layer may be formed by applying any known method of forming porous alumina or porous silicon.

Figure 3A:
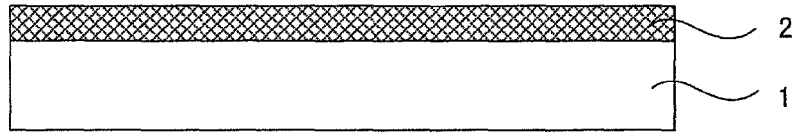
FIG. 3 are schematic diagrams each showing another example of the anti-reflection layer according to the invention.
Figure 3B:
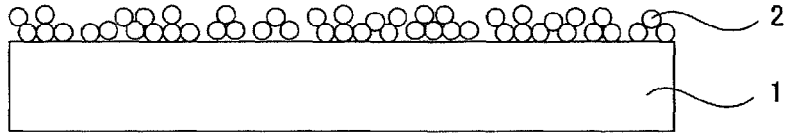

FIGS. 3A and 3B are schematic diagrams each showing an example of the anti-reflection layer 2 having the fine porous structure formed on the substrate 1. As shown in the drawings, the fine porous structure may be a porous layer or may be a laminate of multiple layers of fine particles with any of various shapes.

First, a description is provided of the fine uneven structure. The fine uneven structure for use in the invention may be formed by a method including the process of processing a flat layer by etching or the like so as to form unevenness or may be monolayer arranged by fine particles.

When fine particles are used to form the fine uneven structure, their average particle diameter is preferably from 50 nm to 300 nm, more preferably from 70 nm to 250 nm. The above range is preferred for the purpose of attaining the function of the anti-reflection layer. It will be understood that the shape of the fine particles with such a particle diameter is not limited to a sphere.

The average particle diameter is defined by a mean value of the respective particle diameters measured from electron microscope images. When the material for use is colloidal, the average particle diameter is determined by a colloid-scientific particle diameter measurement method such as a light-scattering method.

In such a structure, any fine particles may be used as long as they are transparent in the visible light range and can have a bulk refractive index smaller than that of the substrate when the fine particle layer is formed.

Examples of the applicable inorganic material for the fine particles include $MgF_2$ (refractive index 1.38), $SiO_2$ (refractive index 1.46), $AlF$ (refractive index 1.33-1.39), $CaF_2$ (refractive index 1.44), $LiF$ (refractive index 1.36-1.37), $NaF$ (refractive index 1.32-1.34), and $ThF_4$ (refractive index 1.45-1.5).

Examples of fine organic material particles include fine particles of polymers. Specific examples thereof include crosslinked acrylic fine particles (such as MX series and MR series both manufactured by Soken Chemical & Engineering Co., Ltd.), uncrosslinked acrylic fine particles (such as MP series manufactured by Soken Chemical & Engineering Co., Ltd.), crosslinked polystyrene fine particles (such as. SGP series manufactured by Soken Chemical & Engineering Co., Ltd.), uncrosslinked polystyrene fine particles, monodisperse poly(methyl methacrylate) fine particles with a high degree of crosslinking (such as MS series and M series both manufactured by Soken Chemical & Engineering Co., Ltd.), fine particles of any combination thereof, and fine particles having an introduced functional group.

In particular, silica ($SiO_2$) fine particles or polymer fine particles are preferably used in the invention.

On the other hand, the anti-reflection layer having fine unevenness may be formed by a process including the processes of forming a flat layer and forming unevenness in the layer by etching or the like. In such a case, the depth of the uneven structure is preferably in the range from 80 nm to 250 nm, more preferably from 90 nm to 200 nm, still more preferably from 100 nm to 180 nm. The above range is preferred for the purpose of prevention from scattering of incident light. In addition, the pitch of the unevenness (an average distance between adjacent bumps or dips) is preferably in the range from 100 nm to 1000 nm, more preferably from 150 nm to 500 nm. The anti-reflection layer is preferably provided in the above range.

A polymer material that is transparent and has no fluorescent characteristic in the visible light range is preferably used to form the anti-reflection layer with fine unevenness. Examples of such a material include (meta)acrylic-based resins, styrene-based resins, cycloolefin-based resins, polyesters, and polycarbonates.

The method of forming the fine uneven structure can broadly be divided into a subtractive method and an additive method. The subtractive method includes etching or selectively removing a material. Examples of the etching method include an oxygen plasma treatment method and a sandblasting method. Examples of the selectively removing method include methods using the phase-separated structure of a polymer and selective solubility of the polymer as described above. The additive method includes forming a material into a film with the uneven structure on a substrate. A dry process includes a sputtering method, a PVD method and a CVD method. A wet process includes a method of producing a film with a particle-containing coating liquid by an adsorption method, a spray method, a dip coating method, or the like.

A porous layer with the fine porous structure maybe produced with a material having continuous holes whose diameter is in the range from 3 nm to 90 nm, particularly from 5 nm to 70 nm.

Such a material may preferably be produced by a method of forming a laminate of fine particles, such as a layer-by-layer adsorption method and a particle settling method. The particles are preferably silica particles or transparent particles such as polymer particles. The average particle diameter is preferably in the range from 20 nm to 100 nm, particularly preferably from 30 nm to 80 nm. Alternatively, the laminate of the fine particles may be used as a mold for forming the porous structure. For example, such a method includes the processes of penetrating a low-molecular material into the pores of the laminate of the particles, allowing it to react in situ to form a self-supporting material, and then selectively removing the particles.

Light-Absorbing Layer

Any light-absorbing layer may be used as long as it has the function of absorbing excitation light. In a preferred mode, the absorption rate of excitation light that reaches the light-absorbing layer is 50% or more, particularly 90% or more.

Similarly to the anti-reflection layer, the light-absorbing layer may have a flat structure or an uneven structure. When the light-absorbing layer is placed on the immobilization layer side, it should preferably have the fine uneven structure or the fine porous structure in terms of higher packing density of probe biomolecules, similarly to the anti-reflection layer.

The light-absorbing layer having the flat structure may be formed by a method of applying coating material, which absorbs incident light, to a substrate. A colored glass or a colored plastic may be used as the substrate. The light-absorbing agent should be a material whose fluorescent spectrum does not overlap with the fluorescent spectrum of the fluorescent molecule and which has excitation light absorbing properties. It is particularly preferred that the light-absorbing agent produces no fluorescence by the excitation light. Examples of such a material include graphite and fullerene. The binder may be made of any general binder resin. The light-absorbing layer having the fine uneven structure may be formed by an etching, such as sandblasting method, a colored substrate or substrate with a light-absorbing layer The light-absorbing layer having the fine porous structure may be prepared by a method of selectively removing the binder resin, such as an oxygen plasma method, or by a layer-by-layer adsorption method or the like.

Reflecting Layer

In the invention, it is advantageous that the reflection function region is formed in a pattern as described above. Such a reflecting layer may be formed by a method of vapor-depositing, on a substrate, a metal material such as aluminum, gold and silver or an organic metal material such as titanium alkoxide, through a metal mask having the desired opening. Another method includes the processes of attaching a catalyst in a pattern to a substrate and performing electroless plating of nickel, copper, gold, or the like to form the reflecting layer. After the reflecting layer is formed on the substrate surface by vapor deposition or electroless plating, it may also be subjected to photoresist lithography and etching so as to form a desirably patterned reflecting layer (a reference material: Japanese Patent Application Laid-Open (JP-A) No. 2002-153272).

Substrate

In the invention, the material for the substrate may be selected so as to satisfy the required characteristics depending on the use. Examples thereof include a metal such as aluminum, copper, stainless steel, and zinc; a semiconductor such as silicon; an inorganic material such as glass; and a film mainly composed of a polymer material such as polyethylene terephthalate and polypropylene. A transparent material is generally used, such as glass and a polymer material. In a preferred mode, the form of the substrate is flat like a slide glass or has a number of independent wells like a microwell plate.

In the invention, for the purpose of providing the substrate for bio-microarray with the reflection-suppressing function, a substrate having the reflection-suppressing function by itself may be used in place of providing an additional layer as described above. Examples of such a substrate include a substrate whose surface has the fine uneven structure and a substrate having the fine porous structure. Such a fine uneven or fine porous structure may be formed by the method as described above.

Such a structure may be formed on one or both sides of the substrate. If the structure will be formed on one side, it should be preferably formed on the side where the probe biomolecules will be immobilized, in terms of high-density integration of probe biomolecules.

Immobilization Layer

The immobilization layer for use in the invention is a thin film that is provided on the substrate for the purpose of immobilizing the probe biomolecule. For example, such an immobilization layer is formed by a process including the processes of: washing the substrate surface with an alkali and rinsing it so that the surface becomes negatively charged; allowing an immobilization agent such as poly-L-lysine to adsorb to the surface so that the surface becomes positively charged; removing unnecessary poly-L-lysine by a centrifuge; and drying it. There is another method including the process of chemically vapor-depositing an active molecule having an amino group on the substrate surface. For example, the active molecule is aminopropyltriethoxysilane or the like. There is yet another method of forming an absorption layer of a polymer material having an aldehyde group or an active ester group or the like.

The thickness of the immobilization layer is preferably within the limits of not ruining the purposes of expanding the surface area and integrating the probe biomolecules at high density in the process of forming the anti-reflection or light-absorbing layer with the uneven structure on the substrate or in the process of forming the uneven structure in the substrate surface itself as described above. Specifically, the thickness of the immobilization layer is preferably ⅓ or less of the average depth of the unevenness or ⅓ or less of the average pore size, and is more preferably of the order of monomolecular layer (molecular adsorption layer) thickness.

In the invention, it is particularly preferred that regions having at least two different surface free energies are arranged in a pattern on the substrate. Specifically, it is preferred that the immobilization layer should be patterned and that the immobilization layer and the substrate surface should be different in surface free energy. Herein, the surface free energy refers to an energy (erg·cm$^{-2}$) necessary for the generation of the surface per unit area and may be used as an index to the force which is exerted on the surface molecules so as to pull them toward the inside.

It is also preferred that such regions having different surface free energies should comprise: a plurality of independent regions each having a high wettability with respect to the probe biomolecule and having a first surface free energy; and a continuous region that is placed around the above regions and has a low wettability with respect to the probe biomolecule and a second surface free energy. The difference in surface free energy between the immobilization layer and the substrate surface is so used that the loaded probe biomolecules can be prevented from diffusing and integrated at higher density and that adsorption of unnecessary probe biomolecules can be prevented so that the analysis accuracy can further be increased.

The regions having different surface free energies may have any of various patterns such as a pattern of a hydrophilic region and a hydrophobic region, a pattern of an electrically charged region and an uncharged region, and a pattern of a region capable of covalently bonding to the probe biomolecule and a region incapable of covalently bonding to it.

For example, the patterned regions having different surface free energies may be formed on the substrate by a method including the processes of: forming a thin film of an immobilization agent such as poly-L-lysine as described above; and then forming the desired pattern using a photocatalyst technique, an etching method, a photolithography method, or the like. Herein, the photocatalyst technique refers to the method as disclosed in JP-A Nos. 2002-274077 and 2000-249821.

Alternatively, a printing method such as a microcontact printing method, a flexo printing method and a gravure method may be used to form the patterned regions with different surface free energies on the substrate.

Mark for Positional Detection

In a particularly preferred mode of the invention, a mark for positional detection is formed on the substrate. Specifically, the mark for positional detection is preferably formed on a part not overlapping with the microarray region for the purpose of detecting the coordinate position of each spot on the substrate at the time of spotting the probe or detecting the analyte. It is particularly effective in such a case where different reagents should be used according to the spot position on the microarray. The mark for positional detection may be an optically-readable mark, an electrically-readable mark, or a magnetically-readable mark. The optically-readable mark is preferred, because it can easily be observed using a microscope or an image display device.

Examples of the method of forming the mark for positional detection include: a method of previously forming the mark for positional detection on a specific position in the substrate by a printing method, an etching method, a plating method, or the like; and a method including the processes of simultaneously forming a latent image of the mark for positional detection in the process of forming a pattern for arranging patterned regions with at least two different surface free energies and then applying ink or performing metal-plating only onto the latent image position.

The mark for positional detection may be formed on any of the layers according to the invention as long as its readable properties are not degraded.

B. Bio-Microarray

The inventive bio-microarray is characterized by comprising the inventive substrate for bio-microarray as described above and probe biomolecules bonded to the substrate. The inventive bio-microarray is comprised of the substrate for bio-microarray having the reflection-suppressing function and thus can relatively increase the signal intensity of the fluorescent label and can provide high analytical accuracy. If the inventive bio-microarray has the specific structure in the anti-reflection layer, it can have not only the reflection-suppressing function but also the function of integrating the probe biomolecules at a high density so that high sensitivity can be provided. If the inventive bio-microarray is comprised of the substrate for bio-microarray having the reflection-suppressing function and the reflection function each formed in a pattern, it can increase the signal intensity of the fluorescent label and can also suppress the reflection of unnecessary excitation light so that the resulting analysis accuracy can further be improved, and thus it can have various advantages.

A spotting method comprises a spotting process of forming spots of a solution containing probe biomolecule on the microarray substrate and a post-treatment process of immobilizing the spots.

The solution (or dispersion) containing probe biomolecule for use in the spotting process may be prepared in advance or may be prepared on the substrate by spotting the probe biomolecule and a solvent, respectively. The probe biomolecule solution may have any concentration within a normal range. Any solvent may be used for dissolving the probe biomolecule as long as it is inert to the biomolecule, and it may appropriately be selected depending on the use.

The diameter of the spot formed on the microarray substrate may vary depending on the use but is preferably in the range from 50 μmφ to 400 μmφ in terms of quantification performance and analytical efficiency.

In the post-treatment process, for example, a treatment for adjusting the shape of the spots is performed, and then UV irradiation is performed to crosslink the probe biomolecule so that the bonding between the molecule and the microarray substrate can be strengthened.

The substrate is then immersed in a post-treatment solution so that the part not loading probe biomolecule is masked. The post-treatment solution may be appropriately chosen depending on the use. For example, such a solution may contain succinic anhydride, N-methylpyrrolidinone, 0.2 M sodium borate (pH 8.0), or the like. Washing with 95° C. distilled water and 95% ethanol is then performed to remove an adhering unnecessary material from the microarray substrate, and centrifugal treatment and drying are performed so that a microarray is obtained.

The probe biomolecules may be bonded to the microarray substrate by the above spotting method or by any other method such as an inkjet method and a nozzle method.

As described above, the applicable biomolecule include not only DNA but also RNA, peptides, proteins, polysaccharides, cells and tissues.

The above embodiments are not intended to limit the scope of the invention. The above embodiments should be taken as an illustration, and it will be understood that any other products having a structure substantially equal to that in the technical scope of Claims and achieving a similar effect should be considered to be within the scope of the invention as defined in Claims.

EXAMPLES

The invention is more specifically described with reference to the examples below.

Example 1

Forming Anti-Reflection Layer on Substrate

First, prepared were a solution of 0.4% polydiallyldimethylammonium chloride (PDDA with a molecular weight of 400,000 to 500,000 manufactured by Aldrich Chemical Company), a dispersion of silica particles (MP-1040 manufactured by Nissan Chemical Industries, Ltd.) and ion exchange water. A commercially available slide glass was washed and then immersed in the PDDA solution for two minutes so that PDDA was allowed to adsorb onto the slide glass. Washing with the ion exchange water was then performed for two minutes for the purpose of removing unnecessary PDDA. The PDDA-adsorbing slide glass was then immersed in MP-1040 for one minute for the purpose of forming an anti-reflection layer. After the silica particles were allowed to adsorb, washing with ion exchange water whose pH was adjusted to 10 was performed for four minutes. After the process, an anti-reflection layer comprising fine particles and having unevenness was formed on both sides of the slide glass.

Forming Immobilization Layer on the Substrate Having Anti-Reflection Layer

The substrate having anti-reflection layer as prepared above was immersed in a solution of 0.1% poly-L-lysine (manufactured by Wako Pure Chemical Industries, Ltd.) for five minutes and then washed with ion exchange water for two minutes. An immobilization layer comprising the poly-L-lysine was formed at a molecular layer level by this process. A microarray substrate was obtained by a series of these processes.

Example 2

Forming Anti-Reflection Layer on Substrate

Prepared were a solution of 0.4% polyallyamine hydrochloride (PAH manufactured by Aldrich Chemical Company), a solution of 0.4% polyacrylic acid (PAA manufactured by Aldrich Chemical Company), and ion exchange water. The PAH solution and the PAA solution were prepared so as to have a pH of 7.8 to 8.5 and a pH of 3.5, respectively. A commercially available slide glass was washed and then subjected to 10 cycles of PAH/PAA alternate adsorption (10 cycles of PAH adsorption and 10 cycles of PAA adsorption) so that a layer-by-layer self-assembled film was prepared. The film was then treated with acid so as to have a porous structure/uneven structure for providing an anti-reflection performance. Heat treatment was then performed to crosslink PAH and PAA by amide bond so that the anti-reflection structure was fixed. A series of these processes were according to Hiller et al., Nature Materials, Vol. 1, page 59, 2002.

Forming Immobilization Layer on the Substrate Having Anti-Reflection Layer

The substrate having anti-reflection layer was dip-coated with poly-L-lysine from a solution. An unnecessary solution was removed by centrifugation so that an immobilization layer was formed. A microarray substrate was produced by a series of these processes.

Example 3

Forming Anti-Reflection Layer on Substrate

The process of Example 1 was used.

Forming Immobilization Layer on the Substrate Having Anti-Reflection Layer

Chemical vapor deposition using 3-aminopropyltriethoxysilane (manufactured by Across Chemical Co.) was performed to form an amino group-containing layer on the surfaces of the silica particles used in the anti-reflection layer. A microarray substrate was prepared by a series of these processes.

Example 4

The microarray substrate prepared in Example 3 was irradiated with vacuum ultraviolet radiation through a quartz chromium mask having 300 μmφ light-blocking parts at a pitch of 600 μmφ so that the organic material was removed from the part other than the biomolecule-loading part. The part from which the organic material was removed had a silica-like surface. The prepared microarray substrate had 300 μmφ amino group-containing regions at a pitch of 600 μmφ.

Example 5

The patterned microarray substrate prepared in Example 4 was used, and octadecyltrimethoxysilane (ODS) was chemically vapor-deposited thereon. Thereafter, the substrate was thoroughly washed with cyclohexane so that physically adsorbing ODS was removed from the amino group-containing pattern. Through a series of these processes, a microarray substrate, having array pattern which contains amino group on the anti-reflection layer and whose periphery was masked with the octadecyl group, was obtained.

Example 6

Forming Anti-Reflection Layer on Substrate

First, prepared were a solution of 0.4% polydiallyldimethylammonium chloride (PDDA with a molecular weight of 400,000 to 500,000 manufactured by Aldrich Chemical Company), a dispersion of polymer particles (AE137 manufactured by JSR Corporation) and ion exchange water. A commercially available slide glass was washed and then immersed in the PDDA solution for two minutes so that PDDA was allowed to adsorb onto the slide glass. Washing was then performed with the ion exchange water for two minutes for the purpose of removing unnecessary PDDA. The PDDA-adsorbing slide glass was then immersed in AE137 for two minutes for the purpose of forming an anti-reflection layer. After the polymer particles were allowed to adsorb, washing with ion exchange water was performed for four minutes. After dried, the material was heat-treated at 60° C. for 30 minutes so that adhesion of the particles to the substrate was enhanced. An anti-reflection layer having unevenness and composed of fine polymer particles was formed on both sides of the slide glass by a series of these processes.
Forming Immobilization Layer on the Substrate Having Anti-Reflection Layer The substrate with anti-reflection layer was dip-coated with poly-L-lysine from a solution. An unnecessary solution was removed by centrifugation so that an immobilization layer was formed. A microarray substrate was produced by a series of these processes.

Example 7

Forming Anti-Reflection Layer on Substrate

First, prepared were a solution of 0.4% polydiallyldimethylammonium chloride (PDDA with a molecular weight of 400,000 to 500,000 manufactured by Aldrich Chemical Company), two types of dispersions of silica particles (Snowtex 40 and Snowtex 20L both manufactured by Nissan Chemical Industries, Ltd.) and ion exchange water. After a commercially available slide glass was washed, a set of: adsorption of PDDA and washing; adsorption of Snowtex 40 and washing; adsorption of PDDA and washing; and then adsorption of Snowtex 20L and washing was performed three times (the uppermost surface was the silica layer) so that a porous anti-reflection layer was formed of a laminated structure of the fine particles using PDDA as an adhesive.
Forming Immobilization Layer on the Substrate Having the Anti-Reflection Layer Chemical vapor deposition using 3-aminopropyltriethoxysilane (manufactured by Across Chemical Co.) was performed to form an amino group-containing layer on the surfaces of the silica particles used in the anti-reflection layer. A microarray substrate was prepared by a series of these processes.

Example 8

Forming Anti-Reflection Layer on the Substrate Having Light-Absorbing Layer

A slide glass having an attached black tape on its back side was used as a substrate, and an anti-reflection layer was formed only on the front surface of the substrate by the process according to Example 1.
Forming Immobilization Layer Pattern and Latent Image of Positional Detection Mark on the Substrate Having the Light-Absorbing Layer and the Anti-Reflection Layer First, ODS was chemically vapor-deposited to form a layer containing octadecyl group on the anti-reflection layer. Similarly to Example 4, vacuum ultraviolet radiation treatment was then performed using a chromium mask having 200 μmφ non-light-blocking parts at a pitch of 500 μmφ (for a microarray pattern) and a non-light-blocking part in the shape of 50 μmφ-wide 2 mm-long lines orthogonally intersecting at the midpoint (for a positional detection mark pattern).
Forming Mark for Positional Detection Microdroplets of silver colloid ink were placed on the latent image formed by the above process, and then an unnecessary amount of the ink was sucked up so that the silver colloid ink was left only on the latent image. It was dried to form a mark for positional detection, which had a metallic luster.
Forming Patterned Immobilization Layer on the Substrate through the Above Process Chemical vapor deposition of 3-aminopropyltriethoxysilane was performed on the substrate with the mark for positional detection, so that 200 μmφ amino group-containing immobilization layers were formed at a pitch of 500 μmφ at the ODS-excluding part on the anti-reflection layer. After a series of these processes, a microarray substrate was prepared, comprising: the substrate having the light-absorbing layer on the back side and the anti-reflection layer on the front side; and the mark for positional detection and the patterned immobilization layers formed on the substrate.

What is claimed is:

1. A substrate for bio-microarray comprising:
   a substrate;
   an anti-reflection layer formed on the surface of the substrate; and
   an immobilization layer for immobilizing a probe biomolecule formed in a pattern on the surface of the substrate, wherein the anti-reflection layer is formed only in a region other than a region in which the immobilization layer is formed.

2. The substrate for bio-microarray of claim 1, wherein the anti-reflection layer has a fine uneven structure comprising a fine particle of diameter in a range of 50 nm to 300 nm; and
   further wherein a bulk refractive index of the fine particle is smaller than that of the substrate.

3. The substrate for bio-microarray according to claim 1, wherein the anti-reflection layer has a fine uneven structure with a depth in a range of 80 nm to 250 nm; and
   further wherein a refractive index of the anti-reflection layer is smaller than that of the substrate.

4. The substrate for bio-microarray according to claim 1, wherein the anti-reflection layer has a fine porous structure; and further wherein a refractive index of the anti-reflection layer is smaller than that of the substrate.

5. The substrate for bio-microarray according to claim 1, further comprising a mark formed on the substrate for positional detection.

6. A bio-microarray comprising the substrate for bio-microarry of claim 1, and the probe biomolecule immobilized on the immobilization layer of the substrate.

7. The substrate for bio-microarray according to claim 1, further comprising a reflection layer between the substrate and the immobilization layer.

* * * * *